Jan. 12, 1960  H. L. COOK ET AL  2,920,581
TRAM CARRIER
Filed Nov. 22, 1957

INVENTORS
HOWARD L. COOK
CHARLES W. CANADA
BILLY L. SMITH

BY Ralph B. Pastoriza
ATTORNEY

United States Patent Office 2,920,581
Patented Jan. 12, 1960

---

2,920,581

TRAM CARRIER

Howard L. Cook and Charles W. Canada, Santa Barbara, and Billy L. Smith, Inglewood, Calif., assignors, by mesne assignments, to Curtiss-Wright Corporation, a corporation of Delaware Application November 22, 1957, Serial No. 698,174

4 Claims. (Cl. 104—93)

This invention relates generally to transporting apparatus for carrying work or stock in assembly plants, machine shops, and other process industries, and more particularly to an improved tram carrier structure of greater versatility than presently available carriers.

Tram carriers of the overhead type usually include a frame or other axle structure supporting wheels which run on suitable overhead tracks. Generally, these systems are only capable of supporting loads depending vertically from the track. Some side thrust, however, can be tolerated in the event conventional wheel flanges are provided. On the other hand, there is generally no assurance that the wheels will not move off the track if an upward force is applied to the carrier.

In assembly line operations wherein a number of identical parts are to be treated in exactly the same manner, it is common practice to transport the parts on a tram carrier of the above described type. If the particular operation involved is that of painting, for example, the part will not usually have all of its surfaces exposed when passed through a suitable housing or other treating enclosure on the carrier. One solution is to remove and reposition the part on the carrier or simply redirect the spraying equipment. In other instances particular machining operations to be performed on a part may require removal of the part from the conveyor to enable a repositioning of the same so that the machining operation may be carried out.

Bearing the above in mind, it is a primary object of the present invention to provide a greatly improved tram carrier or conveyor for moving parts and the like which is capable of withstanding a load in any direction and thus is not limited to the transportation of downwardly depending parts.

More particularly, it is an object to provide a tram carrier of the above type which may be readily adapted to rotating a work completely through 360 degrees while in transit such that any treating process, for example, painting or metal plating, may be readily carried out without removing the work from the carrier and with assurance that all surfaces will be exposed.

Still another object of this invention is to provide an improved overhead tram carrier which may support relatively heavy loads with light rolling friction and in which the carrier cage is held on the track regardless of the point of attachment of the particular load.

Briefly, these and many other objects and advantages of the present invention are attained by providing a longitudinal track comprising a series of flanges all extending laterally and from the longitudinal central axis of the track in different directions to define V-shaped channels between adjacent flanges at their common lines of intersection at said axis. These channels are arranged to receive suitable ball bearings secured in bearing supports. These bearing supports in turn are held in spaced relationship by a cage structure to which the load or part to be transported is secured. By this arrangement, the roller bearings are essentially held within the V-shaped channels defined by flanges comprising the track to ride in the apices of the V-shaped channels so that the carrier can take loads in any direction without becoming disengaged from the track. By twisting the track, the tram carrier can be made to follow a helical path through 360 degrees whereby a work or part is effectively rotated about a complete circle.

A better understanding of the invention will be had by referring to preferred embodiments thereof as illustrated in the accompanying drawings, in which.

Figure 1:
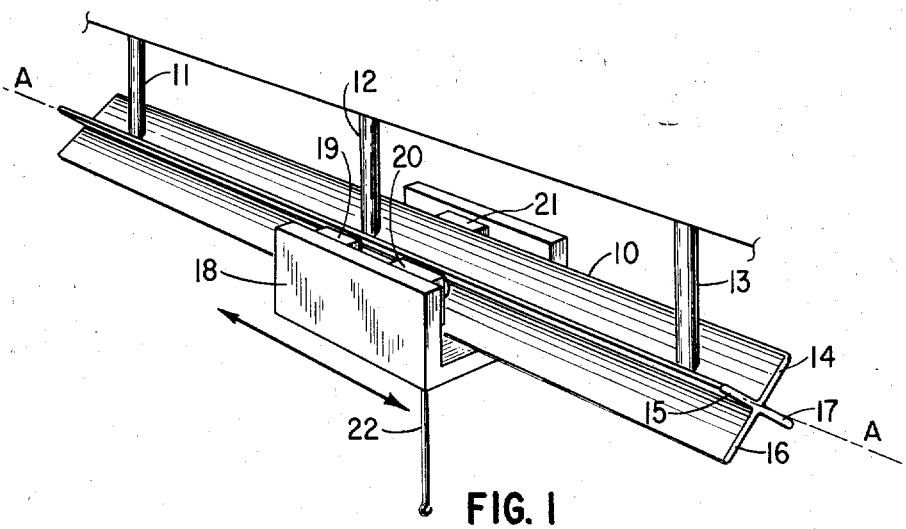
Figure 1 is a schematic perspective view of a portion of the improved track and tram carrier forming the present invention.

Referring first to Figure 1 there is illustrated a track 10 which may be supported to a ceiling or wall as by track supports 11, 12, and 13. As shown the track itself comprises four flanges 14, 15, 16 and 17 all extending laterally from a single central longitudinal axis A—A of the track. Preferably these flanges are successively circumferentially spaced at 90 degrees so that the cross section of the track is essentially X-shaped with the opposite bisectors of the vertical and horizontal angles extending in vertical and horizontal directions respectively. Shown on the track 10 is a cage structure 18 supporting a plurality of ball bearings 19, 20, and 21.

In the embodiment shown in Figure 1, only three such ball bearings are employed, two of them, 19 and 20, being received in the apex of the V-shaped channel defined by the flanges 15 and 16 on one side of the axis A—A, and the third, 21, riding in the corresponding apex of the V-shaped channel defined by the flanges 14 and 17 on the opposite side of the central axis. A securing member 22 may project from the cage 18 for holding a work or part to be transported.

Figure 2:
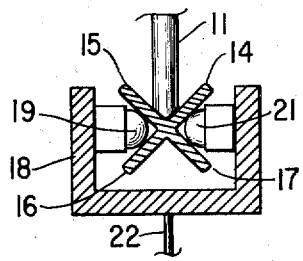
Figure 2 is a front elevational view of the structure illustrated in Figure 1.

Referring to Figure 2, it will be noted that the ball bearings 19 and 21 engage surfaces of both of the adjacent flanges 15, 16, and 14, 17, respectively. It will be evident therefore that both downwardly and upwardly directed loads will be equally well supported. Further, it will be evident that side loads or thrusts will also be supported.

In the embodiment shown in Figures 1 and 2, the cage is C-shaped in cross section to leave an opening for the track supports such as the support 11 shown in Figure 2 when the cage moves along the track in a longitudinal direction. In the event transportation need only be effected over a short distance such that the track can be supported at its two opposite ends, the C-cage structure may be modified to completely enclose the track and an additional bearing support means may be provided to ride in the upper V-channel defined by the flanges 14 and 15.

Figure 3:
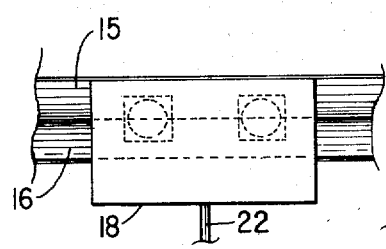
Figure 3 is a side view of the tram carrier.

Figure 3 illustrates the C-shaped cage 18 of Figure 2 in side view wherein the dotted lines show the relative positions of the two bearing supports 19 and 20 of Figure 1. By providing at least two bearings on one side of the track and one bearing on the opposite side, angular motion of the cage 18 about a vertical axis is prevented and the cage is held in a consistent position relative to the track flanges.

Figure 4:
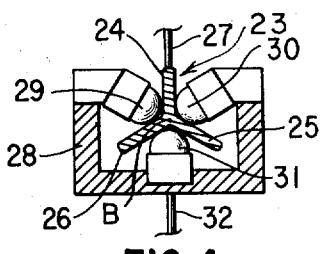
Figure 4 is a front view of a modified embodiment of the invention.

Figure 4 illustrates a modified type of track structure and tram carrier in accordance with the principles of the present invention. As shown, this modified track 23 includes a central axis B normal to the plane of the drawing from which only three flanges 24, 25, and 26 extend laterally and are spaced circumferentially with respect to the axis B at 120 degrees. Suitable overhead track supports 27 corresponding to supports 11, 12, and 13 of Figure 1 may be provided. The cage structure 28 is C-shaped as in the case of the cage structure 18 and is provided with a first set of three ball bearings 29, 30, and 31 respectively held in the apices of the V-channels defined by the intersections of the three flanges on the axis B respectively. A second set of three ball bearings may be provided on the cage 28 spaced longitudinally behind the first set to lend stability to the cage with respect to angular movements relating to the longitudinal axis B of the track. As shown in Figure 4, a work securing member 32 is provided. As in the case of the cage of Figures 1, 2, and 3, the cage 28 is held in a consistent position with respect to the track flanges and is thus constrained to follow the direction of the track.

In both of the embodiments of Figures 1 and 4, if the track itself is twisted, the cage will follow the twist because of its interlocking relationship to the track as a consequence of the positioning of the bearings. It will be evident therefore that if a work or part is rigidly secured to the cage, the work or part itself may be made to swing through a helical path as the cage travels along the track.

Figure 5:
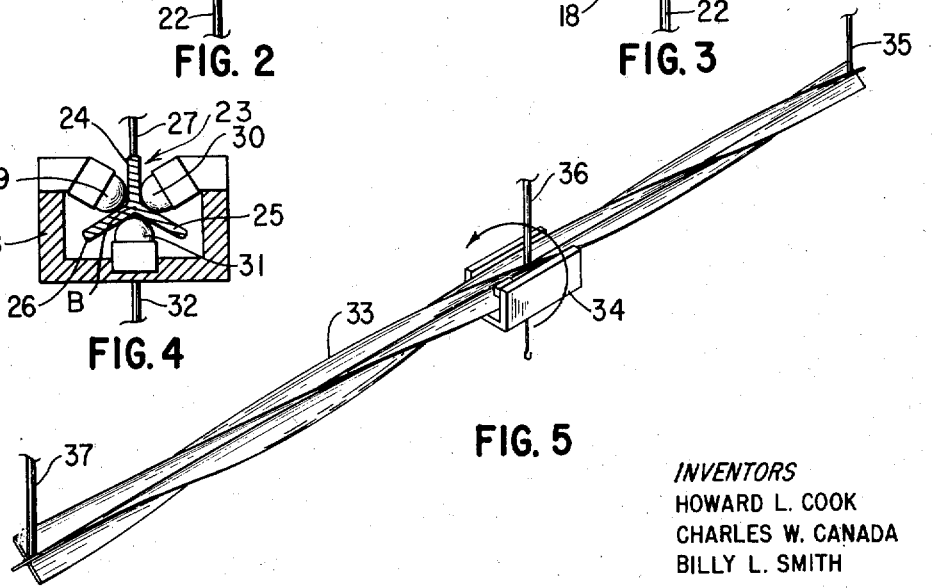
Figure 5 illustrates in perspective view a twisted track structure for guiding a work secured to the tram carrier through desired orientations.

Referring to Figure 5, for example, there is illustrated a twisted track 33 upon which a cage 34 is arranged to travel. This track may be supported by suitable track supports 35, 36, and 37 spaced at distances corresponding to a complete 360 degree twist of the track. However, it will be evident that a twisted track of this type may also be supported by side supports passing to a wall or even by floor supports provided the supports project consistently from the same V-channel portions of the track so that these supports will pass through the open portion of the C-shaped cage structure.

By passing a twisted track of the type illustrated in Figure 5 through a housing or other enclosure including paint spraying or metalizing equipment, for example, a work or stock secured to the cage will have all of its parts exposed to the particular treatment.

From the foregoing description, it will be evident that the present invention provides a greatly improved and more versatile tram carrier than presently available. While this improved carrier has been described only in connection with the transporting of work or parts about a shop, many other applications and modifications of the same will occur to those skilled in the art. The invention is, therefore, not to be thought of as limited to the specific embodiments disclosed for illustrative purposes.

What is claimed is:

1. A tram carrier comprising, in combination: a track having a central longitudinal axis and a plurality of flanges all laterally extending from said axis and all successively equally circumferentially spaced about said axis to define equal angle V-shaped channels such that the common intersection of said flanges at the apices of said V-shaped channels coincides substantially with said longitudinal axis, a cage structure having a C-shape with the open portion of said C-shape receiving said track so that said cage structure extends around said axis of said track more than 180 degrees; and ball bearings rotatably mounted to the inside opposite surfaces of said cage structure on either side of said axis to ride in the apices of two of said V-shaped channels, said cage structure constraining said ball bearings to ride in said apices.

2. The subject matter of claim 1, in which said plurality of flanges are four in number successively circumferentially spaced 90 degrees about said axis so that said track is X-shaped in cross-section, said two of said V-shaped channels having their apices opening in directions 180 degrees from each other in opposing relationship respectively to said inside surfaces of said cage structure.

3. The subject matter of claim 1, in which said plurality of flanges are three in number successively circumferentially spaced 120 degrees about said axis, one of said flanges extending between and substantially parallel to said opposite surfaces of said cage structure so that said ball bearings ride in the apices defined by opposite sides of said one flange and the sides of the other two flanges respectively; and an additional ball bearing rotatably supported at the inner central portion of the C-shape of said cage structure riding in the apex of the V-shape channel defined by said other two flanges.

4. The subject matter of claim 2, in which said track is twisted about said longitudinal axis so that said cage structure follows a helical path when moving along said track.

References Cited in the file of this patent

UNITED STATES PATENTS

| | | |
|---|---|---|
| 660,999 | Richard | Oct. 30, 1900 |
| 827,829 | Thomas | Aug. 7, 1906 |
| 897,388 | Neller | Sept. 1, 1908 |
| 1,089,280 | Slater | Mar. 3, 1914 |
| 1,178,196 | Willard | Apr. 4, 1916 |
| 1,310,854 | Bartine | July 22, 1919 |
| 1,328,523 | Jordan | Jan. 20, 1920 |
| 1,958,162 | Diehl | May 8, 1934 |
| 2,146,289 | Doyle | Feb. 7, 1939 |
| 2,184,860 | Barrett | Dec. 26, 1939 |

FOREIGN PATENTS

| | | |
|---|---|---|
| 121,134 | Austria | Feb. 10, 1931 |